United States Patent
Malen et al.

[15] 3,681,499
[45] Aug. 1, 1972

[54] COMPOSITIONS AND METHOD FOR TREATING GASTRODUODENAL ULCER AND GASTRIC HYPERSECRETION WITH A 2-PYRIDYL THIOACETAMIDE OR A SALT THEREOF

[72] Inventors: Charles Malen, Fresnes; Xavier Pascaud, Paris, both of France

[73] Assignee: Societe en nom Collectif "Science Union et Cie, Societe Francaise De Recherche Medicale", Suresnes, France

[22] Filed: March 31, 1971

[21] Appl. No.: 130,001

Related U.S. Application Data

[63] Continuation-in-part of Ser. No. 845,060, July 25, 1969, abandoned.

[52] U.S. Cl. ................................................424/263
[51] Int. Cl. ..............................................A61k 27/00
[58] Field of Search......................................424/263

[56] References Cited

OTHER PUBLICATIONS

Gardner et al., Journal of Org. Chem., XIX, pp. 753–757 (1954).

*Primary Examiner*—Stanley J. Friedman
*Attorney*—Gordon W. Hueschen and Talivaldis Cepuritis

[57] ABSTRACT

Pharmaceutical compositions containing 2-pyridyl thioacetamide and its salts and method of treating gastroduodenal ulcer and gastric hypersecretion by the same.

15 Claims, No Drawings

COMPOSITIONS AND METHOD FOR TREATING GASTRODUODENAL ULCER AND GASTRIC HYPERSECRETION WITH A 2-PYRIDYL THIOACETAMIDE OR A SALT THEREOF

This application is a continuation-in-part of our copending application Ser. No. 845,060 filed on July 25, 1969, now abandoned.

The present invention relates to new pharmaceutical compositions containing 2-pyridyl thioacetamide of formula

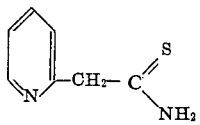

This compound was synthetized by Gardner T. S. & al. [J. of Org. Chem. XIX. 753-757, (1954)]. Tested in the chemotherapy of tuberculosis, it was found devoid of any activity.

It was now surprisingly found that 2-pyridyl thioacetamide possesses an outstanding antisecretory and antiulcer activity on the stomach. This activity was evidenced by the following pharmacological tests:

1. Ulcer of restraint [S. Bonfils et al. : Rev. Fr. Et. Clin. Biol. XI 343 (1966)]. When administered orally at the dose of 20 mg/kg, the product protects 50 percent, and at the dose of 100 mg/kg, 75 percent of rats against ulceration.
2. Histamine-Ulcer [Kowalewsky : Arch. Internat. Pharmacodyn. 170 – 66 (1967)]. The product decreases by 45 percent the ulcer-index in guinea pigs submitted to experimental histamine ulceration.
3. Activity on the gastric secretion.
   A. Method of H. SHAY et al. : Gastroenterology. 5, 43 (1945). The results are reported in table 1.
   B. Method of GHOSH and SCHILD : Brit. J. Pharmacol. 13 54 (1958)

The acidity of the gastric secretion is measured in rats after stimulation by intravenous injection of 2$\mu$g/kg of pentagastrine.

The results are reported in table 2.

| DOSES mg/kg I.V. | Acid Output $\mu$Eq/10 minutes | | Inhibition % |
|---|---|---|---|
| | before treatment | after treatment | |
| 5 mg/kg IV | 6,4 | 1,5 | 76 % |
| | 6,2 | 1,3 | 79 % |
| | 9,8 | 3,8 | 61,2 % |
| | 6,6 | 2,2 | 66,6 % |
| Average | 7,25±1,70 | 2,20±1,13 | 70,7±8,24*** |
| 2,5 mg/kg IV | 3,8 | 2,3 | 39,4 |
| | 5,5 | 2,6 | 52,7 |
| | 4,3 | 2,4 | 44,1 |
| Average | 4,53±0,87 | 2,43±0,15 | 45,4±6,74*** |

4. Administered to mice at doses of 20, 50, 100 and 200 mg/kg orally, the product has no activity on the gastrointestinal motricity.
5. The product has no activity on the autonomous nervous system, either on isolated organs in vitro, nor on acetylcholine, adrenaline or histamine activity in vivo.
6. Doses of 100 mg/kg P.O. of the product do not exert any activity on the central nervous system of rat and mice.
7. The toxicity of 2-pyridyl thioacetamide is very weak. The $LD_{50}$ in mice is 570 mg/kg P.O. and 314 mg/kg I.P.

TABLE 1

| Doses, mg./kg. I.D. | Volume ↓ | pH ↑ | Free HCl Conc. ↓ | Free HCl Output ↓ | Total HCl Conc. ↓ | Total HCl Output ↓ | Na Conc. ↑ | Na Output ↓ | K Conc. ↑ | K Output ↓ | Pepsine[1] Activity | Pepsine[1] Output | Viscosity[2] ↑ |
|---|---|---|---|---|---|---|---|---|---|---|---|---|---|
| 0.5 | 22.6 | ↓5 | ↑19.4 | 12.9 | 1.3 | 20 | ↓10.7 | 23.7 | xxx 61.2 | ↑32.9 | ↑25.9 | 13.5 ↓ | 4.3 |
| 1 | 35.5 | 11.7 | 28.3 | x 55.5 | 17.8 | xx 48.9 | 45.7 | ↑2.0 | xx 81.6 | ↑19.6 | ↑5.5 | x 30 | x 8.6 |
| 2 | xx 51.6 | xx 35.3 | xxx 42.9 | xx 67.7 | xx 29.5 | xx 61.4 | 59 | 23.6 | xxx 138 | ↑21.6 | ↑12.6 | 40 ↓ | xx 13.4 |
| 5 | xxx 71 | xx 153 | xxx 79.8 | xxx 94.5 | xx 51.6 | xxx 86.8 | xxx 102.9 | x 37.9 | xxx 200.5 | 12.3 | xx 24.4 | xxx 61.7 | xxx 21.9 |
| 20 | xxx 80.7 | xxx 307.5 | xxx 100 | 100 | xxx 72.9 | xxx 95.5 | xxx 137.0 | 30.4 | xxx 131.5 | 27.6 | Insufficient quantities | | |

In this table, the figures represent the decrease ( ↓ ) or increase ( ↑ ) in percent, in comparison with the controls after intraduodenal administration of the product.

$x = 0,05 > p > 0,01$ $xx = 0.01 > p > 0,001$ $xxx = p > 0,001$

1. Pepsine is understood as the whole proteolytic activity at pH 1,8 – 2 of the gastric secretion, determined by the autoanalyzer.
2. Viscosity was determined by the viscosimeter of Broukfield at constant temperature.

The figures of this table clearly show an important decrease of the acidity and of the peptic activity and a significant increase of the viscosity of the gastric secretion.

This weak toxicity and the here-above described properties of 2-pyridyl thioacetamide permit its use in therapy, especially in the treatment of gastric hypersecretion and gastroduodenal ulcer.

2-pyridyl thioacetamide is a substance of basic character and can so easily converted in addition salts with mineral and organic acids, such, for example, as hydrochloric, hydrobromic, sulfric, phosphoric, tartaric, citric, acetic, lactic, salicylic, methane sulfonic, fumaric, maleic and similar pharmaceutically lactic, salicylic, methane sulfonic, fumaric, acids.

It can be administered in various pharmaceutical forms, such, for example, as tablets, dragees, capsules, suppositories or solutions in admixture or conjunction with different pharmaceutical solid or liquid carriers such, for example, as distilled water, glucose, lactose, talc, starch, magnesium stearate, ethylcellulose or cocoa butter.

The doses may vary from 50 to 500 mg, preferably 150 to 300 mg, two to three times per day in oral, rectal or parenteral administration.

The following examples illustrate the process for preparing 2-pyridyl thioacetamide and its salts.

EXAMPLE 1

23,6 g (0,2 mol.) of pyridyl acetronitrile, dissolved in 25 ml of triethylamine and 20 g of anhydrous pyridine is saturated with hydrogen sulphide. The reaction mixture is evaporated to dryness. The oily residue is recrystallized in 170 ml of water.

23 g of product are obtained, M.P. 88°–89° C (Kofler). 19 g of this product are dissolved in 250 ml of dry ethanol. There is added under stirring a slight excess of dry hydrochloric acid in ether solution. The hydrochloride is recrystallized from aqueous ethanol. Yield 18 g M.P. 190°–192° C (Kofler inst.).

The following salts were prepared in the same way as in Example 1:

EXAMPLE 2

2-pyridyl thioacetamide citrate, M.P. 146°–147° C (decomp.)

EXAMPLE 3

2-pyridyl thioacetamide sulfate, M.P. 118°–120° C (decomp.)

EXAMPLE 4

2-pyridyl thioacetamide phosphate, M.P. 150°–152° C

EXAMPLE 5

2-pyridyl thioacetamide fumarate, M.P. 142°–144° C

EXAMPLE 6

2-pyridyl thioacetamide maleate, M.P. 130°–132° C (decomp.)

EXAMPLE 7

2-pyridyl thioacetamide d. tartarate, M.P. 141°–142° C

The following examples illustrate the pharmaceutical compositions containing 2-pyridyl thioacetamide.

TABLETS EXAMPLE 8

| | |
|---|---|
| 2-pyridyl thioacetamide, hydrochloride | 0,100 g |
| Starch | 0,125 g |
| Glucose | 0,010 g |
| Talc | 0,020 g |
| Magnesium Stearate | 0,005 g |

SOLUTION FOR INJECTION

| | |
|---|---|
| 2-pyridyl thioacetamide, HCl | 250 mg |
| Distilled water q.s. to | 10 ml |

What we claim is:

1. A pharmaceutical composition in dosage unit form adapted to treat gastroduodenal ulcer or gastric hypersecretion, containing as an active ingredient an effective antisecretory amount of about 50 to about 500 milligrams of 2-pyridyl thioacetamide, or a pharmaceutically acceptable acid addition salt thereof, together with a suitable pharmaceutical carrier.

2. The pharmaceutical composition as claimed in claim 1, containing as active ingredient 2-pyridyl thioacetamide citrate.

3. The pharmaceutical composition as claimed in claim 1, containing as active ingredient 2-pyridyl thioacetamide sulfate.

4. The pharmaceutical composition as claimed in claim 1, containing as active ingredient 2-pyridyl thioacetamide phosphate.

5. The pharmaceutical composition as claimed in claim 1, containing as active ingredient 2-pyridyl thioacetamide fumarate.

6. The pharmaceutical composition as claimed in claim 1, containing as active ingredient 2-pyridyl thioacetamide maleate.

7. The pharmaceutical composition as claimed in claim 1, containing as active ingredient 2-pyridyl thioacetamide d. tartarate.

8. The pharmaceutical composition as claimed in claim 1, containing as active ingredient 2-pyridyl thioacetamide hydrochloride.

9. The pharmaceutical composition as claimed in claim 1, wherein the active ingredient is present in an amount of 150 to 300 milligrams.

10. The pharmaceutical composition of claim 1, in an injectable form containing 250 milligrams of the active ingredient.

11. The pharmaceutical composition of claim 1 in tablet form containing 100 milligrams of the active ingredient.

12. A method of treating a living animal body suffering from gastric ulcer or hypersecretion, which consists of administering to said living animal body an effective antisecretory amount of 2-pyridyl thioacetamide or a pharmaceutically suitable acid addition salt thereof.

13. The method as claimed in claim 12 wherein the antisecretory compound is administered in unit dosage form containing 50 to 500 milligrams of the active antisecretory ingredient.

14. The method as claimed in claim 12 wherein the antisecretory compound is administered orally.

15. The method as claimed in claim 12 wherein the antisecretory compound is administered parenterally.

* * * * *